(12) United States Patent
Bentele-Calvoer et al.

(10) Patent No.: US 7,036,845 B2
(45) Date of Patent: May 2, 2006

(54) METHOD OF TRIGGERING AT LEAST ONE AIRBAG IN A VEHICLE

(75) Inventors: Stephan Bentele-Calvoer, Stuttgart (DE); Klaus Oswald, Wendlingen (DE); Torsten Grotendiek, Bietigheim (DE); Klaus Mindner, Esslingen (DE); Gerhard Loeckle, Ludwigsburg (DE); Barbara Gatzweiler, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 10/258,300

(22) PCT Filed: Jan. 10, 2002

(86) PCT No.: PCT/DE02/00050

§ 371 (c)(1),
(2), (4) Date: Apr. 1, 2003

(87) PCT Pub. No.: WO02/068246

PCT Pub. Date: Sep. 6, 2002

(65) Prior Publication Data

US 2003/0160436 A1 Aug. 28, 2003

(30) Foreign Application Priority Data

Feb. 24, 2001 (DE) ................. 101 09 043

(51) Int. Cl.
*B60R 21/32* (2006.01)
*B60R 21/00* (2006.01)
*B60R 22/00* (2006.01)

(52) U.S. Cl. .................. 280/735; 180/282; 701/45
(58) Field of Classification Search ............... 280/735; 701/45; 180/282
See application file for complete search history.

(56) References Cited

U.S. PATENT DOCUMENTS

| | | | | |
|---|---|---|---|---|
| 4,243,248 A | * | 1/1981 | Scholz et al. ............... | 280/735 |
| 5,746,444 A | * | 5/1998 | Foo et al. ................... | 280/735 |
| 5,999,871 A | * | 12/1999 | Liu ............................. | 701/45 |
| 6,199,903 B1 | * | 3/2001 | Brambilla et al. .......... | 280/735 |
| 6,330,500 B1 | * | 12/2001 | Moriyama et al. .......... | 280/735 |
| 6,421,591 B1 | * | 7/2002 | Hackenberg ................ | 280/735 |
| 2005/0143886 A1 | * | 6/2005 | Theisen ...................... | 701/45 |

FOREIGN PATENT DOCUMENTS

| | | |
|---|---|---|
| DE | 197 43 009 | 4/1999 |
| DE | 199 63 267 | 7/2000 |
| DE | 199 09 538 | 9/2000 |
| DE | 199 45 614 | 12/2000 |
| DE | 199 38 891 | 2/2001 |
| EP | 1 034 985 | 9/2000 |
| WO | WO 01 98117 | 12/2001 |

* cited by examiner

*Primary Examiner*—Paul N. Dickson
*Assistant Examiner*—Joselynn Y. Sliteris
(74) *Attorney, Agent, or Firm*—Kenyon & Kenyon

(57) ABSTRACT

A method of triggering at least one airbag in a vehicle is described, in which two or more criteria are used in the decision to fire the second stage of a two-stage airbag. Variables derived from measurement signals of an acceleration sensor are used as criteria. If these variables exceed threshold values within pre-defined times a firing decision is brought about. The criteria are chosen depending on the type of vehicle. Characteristic curves are used as threshold values. These characteristic curves may be modified depending on the use of a belt.

7 Claims, 5 Drawing Sheets

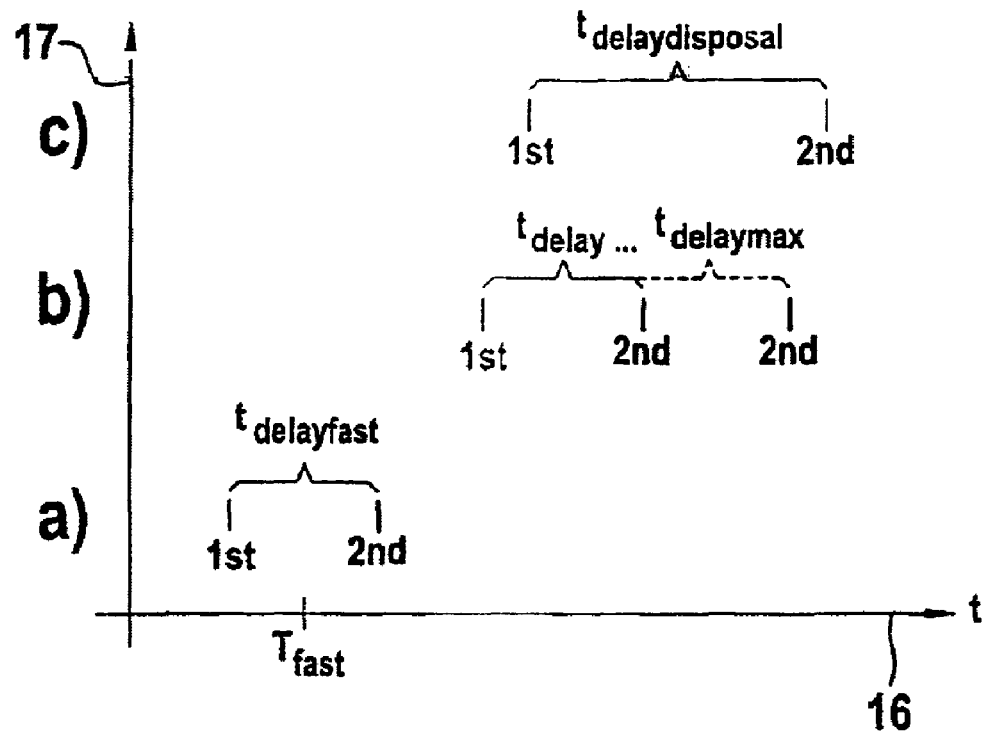
FIG. 3
FIG. 4
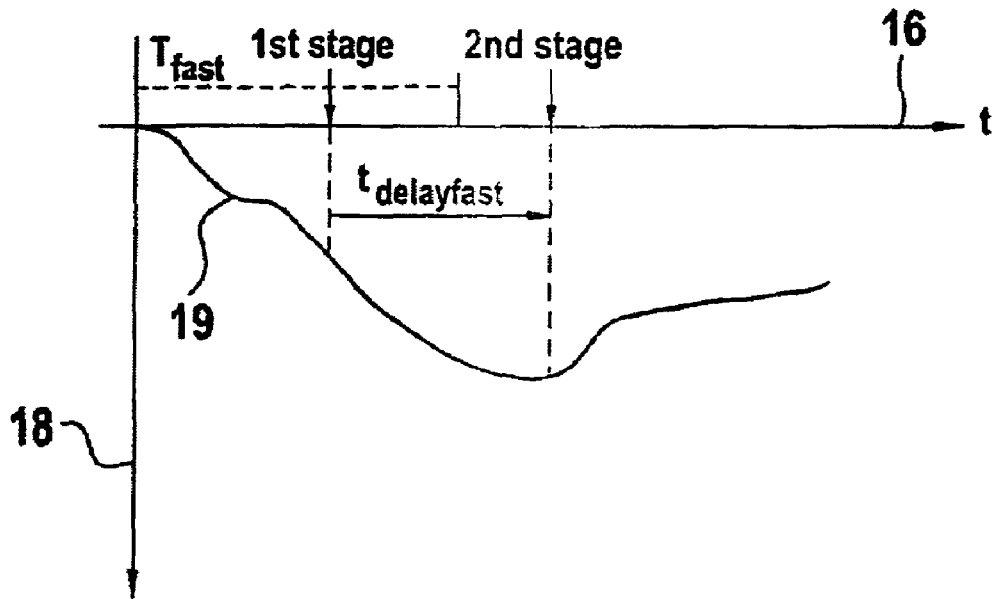

METHOD OF TRIGGERING AT LEAST ONE AIRBAG IN A VEHICLE

FIELD OF THE INVENTION

The present invention relates to a method of triggering at least one airbag in a vehicle.

BACKGROUND INFORMATION

The use of two-stage airbags may be conventional, and even continuously switchable airbags may be possible.

A device having an airbag controller and external acceleration sensors is described in German Published Patent Application No. 199 45 614. A device having an acceleration sensor for impact detection, having a processor, a memory and at least one airbag that may be switched in two stages, is described in German Published Patent Application No. 199 63 267. German Published Patent Application No. 197 43 009 describes a side impact airbag that may deploy if one of the measured values of one of the metrics, lateral velocity or lateral acceleration, is above the corresponding discrimination threshold at the time, or the other measured value or the other metric (lateral acceleration or side airbag) is above the corresponding safeguard threshold. From German Published Patent Application No. 199 09 538 a method of controlling the triggering of a motor vehicle occupant protection system is described in which an acceleration signal may be used to calculate a criterion that is compared to a dynamic threshold value. In this case there may be different dynamic threshold values for the first and the second stages.

SUMMARY OF THE INVENTION

An example method of triggering at least one airbag in a vehicle according to the present invention may require at least two criteria to be fulfilled for the second stage of the airbag to fire early. Various implementations of the at least two criteria may be possible here, for example an AND link, which may provide greater certainty that the situation is really a triggering situation, or an OR link, which may permit greater certainty that a triggering situation may be recognized with high probability. This may increase the certainty of recognition of an impact in an accident of great severity, and thus also of the deployment of the appropriate multi-stage airbag. In particular, it may be possible here to check for the required timely fulfillment of the two criteria. In the case of an impact in an accident of low severity, one criterion may then be used as a criterion for preclusion. That may make it possible for the second stage of the two-stage airbag to be fired after a pre-defined maximum time, so as to moderate the effect of the two-stage airbag. That may make the rate of force per time smaller. Furthermore, when the second stage is fired after an extended time there may already be a reflux of the gas, so that the second stage may be moderated for that reason as well. On the whole, the example method according to the present invention may provide a more precise separation between single-stage and two-stage deployments of an airbag in accidents.

The criteria for actuating the at least two-stage airbag may be selected depending on the type of vehicle. Hence the appropriate criteria for the particular type of vehicle may be selected, so that the at least one airbag may be optimally used.

The parameters selected as appropriate for constituting the criteria may be the variables derived from the acceleration sensor such as acceleration in and transverse to or at an angle to the direction of travel, the corresponding integrated accelerations, double integrals of the accelerations and combinations of such accelerations in and transverse to or at an angle to the direction of travel, the appropriate parameters for constituting the criteria being selected through crash tests, empirical data and simulations.

The second stage of the airbag may be fired after a pre-defined residual firing time when the airbag is deployed, so that the effect of a two-stage airbag may thereby be moderated.

Moreover, a minimum delay time may be adhered to between the firing of the first and the second stage, so that destruction of the ignitor may be prevented. This minimum delay may also be determined by how the parts of the airbag covering are expected to fly through the passenger compartment.

The threshold values may take the form of characteristic curves, so that associated crash profiles may be responded to with the appropriate choice of characteristic curves. This may permit adaptation of the threshold values to an accident as the accident progresses over time.

The criteria may be required to exceed a particular threshold value for a pre-definable decision time in order to recognize that the particular threshold value has been exceeded. In this manner, brief spikes that exceed a threshold value may not be used in a decision to trigger. This may make an example method according to the present invention more reliable in regard to the triggering of restraint arrangement. If both criteria that are used to fire the second stage of the airbag are over their respective threshold value within a pre-definable accident severity time, then a severe accident may be recognized and the second stage may be fired after just the minimum delay, in order to provide maximum protection for the occupants.

The use of a belt may have an influence on the characteristic curves, so that the airbag may be fired accordingly as a function thereof. Thus allowance may be made for interaction of belt and airbag in protecting a person. If a belt is not in use, then airbags may be required to be fired accordingly even at lower accelerations, since then the entire restraining force may be required to be provided by the airbag. The appropriate threshold value may therefore be required to be lowered in such a case, so that a trigger signal may be generated even at another parameter than when a belt is used.

Finally, a device may be provided to perform the example method according to the present invention, having acceleration sensors, a processor, memory and connections to a restraint arrangement in order to be able to perform the example method according to the present invention. A refinement may include provision for acceleration sensors to be located in the vehicle separate from the airbag controller, for example as upfront sensors, i.e., sensors that are positioned in the front of the vehicle, i.e., as close as possible to a frontal impact.

BRIEF DESCRIPTION OF THE DRAWINGS

FIG. 3 shows triggering case scenarios.

FIG. 4 shows a first velocity-time diagram of the X integrator profile.

DETAILED DESCRIPTION

A multi-stage airbag, here in particular a two-stage airbag, may be fired according to the severity of the accident. According to an example embodiment and/or example method of the present invention, two criteria may be used here, to be linked with each other. In the example embodiment the criteria are weighted equally. A logical AND link is used with the intention of bringing about a decision as to whether and when the second stage of the airbag should be fired. It may also be possible for three or more criteria to be used, and/or for additional links of the criteria to be utilized. Such links include an OR link, a NAND link and other logical links. A static link may be, however, possible, for example a correlation.

Figure 1:
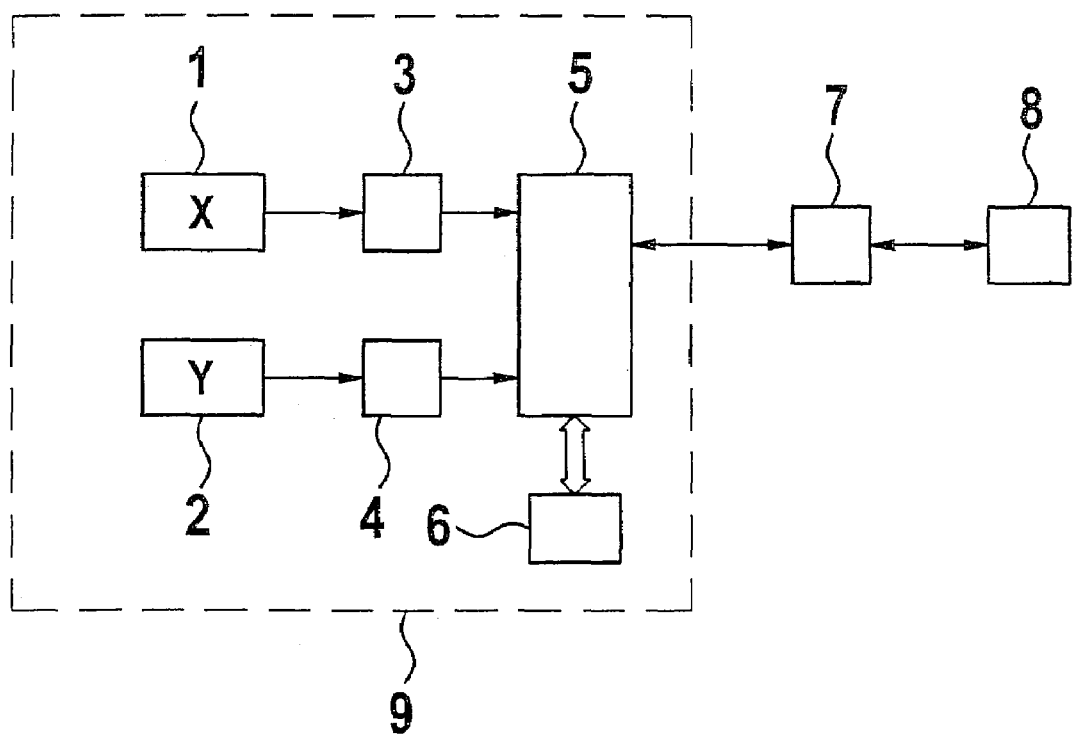
FIG. 1 shows a block diagram of an example device according to the present invention.

FIG. 1 shows as a block diagram an example device according to the present invention for performing an example method according to the present invention for triggering at least one airbag in a vehicle. An airbag controller 9 has an acceleration sensor 1 in the direction of travel, i.e., the X direction, and an acceleration sensor 2 transverse to the direction of travel, i.e., in the Y direction, or else both are installed at an angle to the direction of travel. Controller 9 also has signal processing units 3 and 4, a processor 5 and a memory 6. X acceleration sensor 1 is connected to an input of signal processing unit 3. Signal processing unit 3 is connected to a first data input of processor 5.

Y acceleration sensor 2 is connected to an input of signal processing unit 4. Signal processing unit 4 is connected to a second data input of processor 5. Processor 5 is connected to a memory 6 through a first data input/output. Processor 5 is connected through a second data input/output to an actuator 7 for a restraint arrangement. Actuator 7 is connected through its second data input/output to a restraint arrangement 8, here a two-stage airbag.

Acceleration sensors 1 and 2, which are implemented here as micromechanical sensors, deliver output signals according to the detected vehicle accelerations; these signals are filtered and amplified by electronics on sensors 1 and 2 and are then transmitted to signal processing units 3 and 4, respectively. Signal processing units 3 and 4 each have an analog-to-digital converter, and prepare the measurement data, once it is digitized, for processor 5. The data may be transmitted in telegram form, if appropriate, and is then received by processor 5. Alternatively, signal processing units 3 and 4 may each be associated with sensors 1 and 2 or with processor 5. Peripheral acceleration sensors may also be used here. The signals from the peripheral acceleration sensors are then transmitted via two-wire or bus conductors to controller 9, in that case using data telegrams. Appropriate interface components may then be required.

Processor 5 evaluates the acceleration signals from acceleration sensor 1 and acceleration sensor 2, processing the pure acceleration signals and also aggregate acceleration signals, as well as double-integrated acceleration signals. For the first airbag stage, one criterion is used to determine whether or not triggering should occur. For the second stage, independently thereof, two additional criteria are used, which determine through an AND link when the second stage is to be triggered. Hence ultimately three criteria are present that are checked in order to fire the second stage, the criterion for the first stage being calculated independently of the check of the two additional criteria. The criterion used here for the first stage is the X acceleration signal, i.e., in the direction of travel. However, the second stage is only triggered if the first stage has already been triggered.

Two signals are used as the criteria for the second stage; one signal may also be used for both criteria. If for example the X integrator, i.e., the integrated acceleration signal in the X direction, is used as one criterion in the example method according to the present invention, then the X integrator may be used as a second criterion. Since the threshold values are in the form of characteristic curves here, so that they change as a function of time, when the X integrator is used for both criteria different characteristic curves are used for the second stage, and thus different threshold values. The deciding factor is that both criteria are derived from the signals from acceleration sensors 1 and/or 2, derivation also being used in the sense of direct use of the acceleration signals.

The threshold values which are used for triggering decisions are stored in memory 6, in which times and intermediate results are also stored. The times determine when an event has occurred, for example whether or not there has been a triggering decision.

Controller 9 communicates with actuator 7 to obtain diagnostic data from restraint arrangement 8, in order to be able to determine whether restraint arrangement 8 are ready for operation. This relates in particular to the functionality of a firing arrangement, i.e., ignitors, which are monitored using measurements of resistance. In addition, triggering commands are transmitted from processor 5 to actuator 7, so that restraint arrangement 8, i.e., the two-stage airbag, may be fired. This is done by firing the ignitor with an igniting current.

Figure 2:
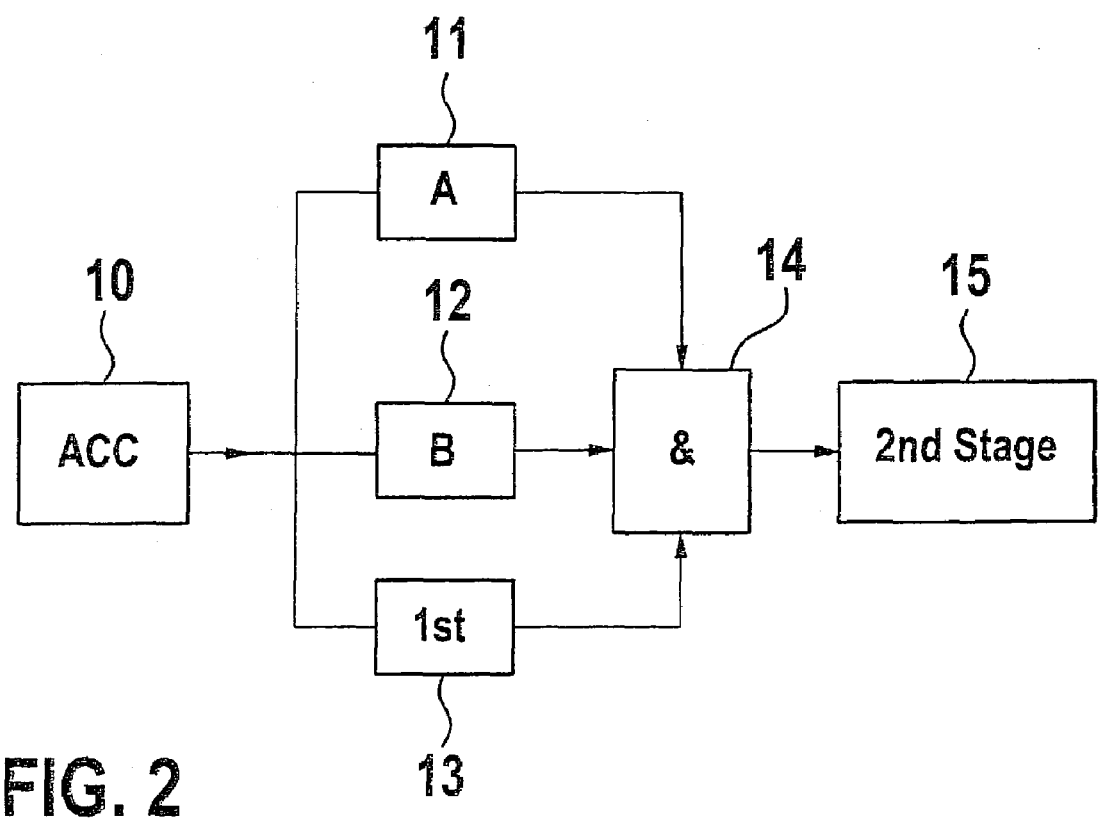
FIG. 2 shows a block diagram of an example method according to the present invention.

FIG. 2 shows an example method according to the present invention as a block diagram. In block 10 Acc, the criteria derived from acceleration sensors are determined and passed along to additional evaluation blocks 11, 12 and 13. In block 11 criterion A, for example the X acceleration signal, is evaluated. In block 12 B the second criterion, for example the aggregate X acceleration signal, is evaluated. In block 13 the decision is made on the basis of the X acceleration signal as to whether the first stage of the airbag should be fired, i.e., whether deployment of the restraint arrangement is required at all. This too is determined through a comparison of threshold values. Thus the basic algorithm is run through here. In block 14, a logical AND link of criteria A and B and a check to determine whether the first airbag stage was fired are performed. If criteria A and B are fulfilled within a certain time and the first stage is fired, then the second stage is also fired in block 15. Thus ultimately three criteria have been checked for the second stage.

Thus the deciding factor is that two criteria should be fulfilled in order to fire the second stage within a pre-defined time after the first stage. Both criteria are derived from the acceleration signals. Independent of the fulfillment of the criteria, the second stage is triggered if the first stage has been triggered. The crucial point is the time sequence of the triggering of the second stage after the first stage.

FIG. 3 shows three different triggering scenarios. In triggering scenario A, the first stage has triggered within an accident severity time stored in memory 6. The second stage of the airbag is therefore fired after a minimum delay time $t_{DelayFast}$. In such a case, since there has been a severe accident the high acceleration signal leads to triggering of the first stage of the airbag. It may therefore be required in such a case for the airbag to fire the second stage with minimum delay, in order to ensure optimal protection of the respective occupant. In this case the system does not wait for fulfillment of the criteria.

The deployment of the airbag may depend on the particular person. Occupant classification systems may be used to ensure that the airbag itself is not the cause of injuries to vehicle occupants. For example, the airbag is not deployed in the case of children if head injuries may be expected.

Scenario B indicates that after the firing of the first stage the second stage may be fired after a time window from $t_{Delay}$ to $t_{DelayMax}$. This may be of interest in particular in the case of accidents of medium severity. In minor accidents scenario C is used; then the second stage is fired after the maximum time, the residual firing time $t_{delaydisposal}$, so that the effect of the two-stage airbag is minimal.

In the following section, velocity-time diagrams are depicted, i.e., the X integrator. In the interest of simplicity only one criterion is shown for the second stage, it being assumed that the first stage has been triggered through the evaluation of a separate criterion and that the second criterion for the second stage behaves like the first criterion for the second stage.

In FIG. 4, scenario A is shown in a first velocity-time diagram, the integration time 16 being displayed on the time axis: the X integrator of the basic algorithm exceeds the triggering threshold within $T_{fast}$, so that the first airbag stage is fired. Hence the second airbag stage is fired after corresponding delay time $T_{delayfast}$.

Thus FIG. 4 shows X integrator signal 18 as a function of time 16. Curve 19 describes this signal. Here the case is depicted that the second stage is fired after a minimum time $t_{delayfast}$ after the firing of the first stage. This is due to the feature that the first stage was triggered within time $t_{fast}$. Thus a severe accident has occurred here, since there were high moments of acceleration in a very short time.

Figure 5:
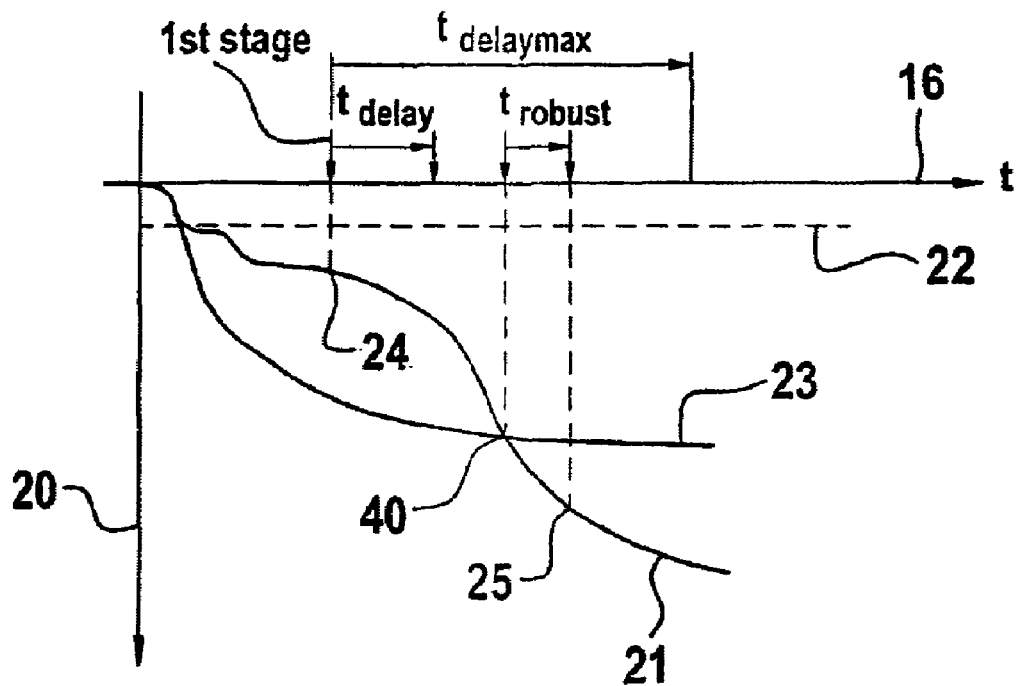
FIG. 5 shows a second velocity-time diagram of the X integrator profile.

FIG. 5 shows a second velocity-time diagram that illustrates how a criterion such as the absolute X integrator for the second stage is fulfilled after the firing of the first stage. Abscissa 16 describes the integration time, while ordinate 20 indicates the velocity, i.e., the integrated acceleration signal. If threshold 22, a noise threshold of the integrator of the basic algorithm, is exceeded, then threshold value 23, which here takes the form of a characteristic curve, is started. At instant 24 the first stage is fired by the basic algorithm. After this firing a pause of $t_{delay}$ is observed, in order to prevent destruction of the ignitor. At instant 40 criterion 21 exceeds threshold value 23, i.e., from now on the criterion is fulfilled. But since it is specified that this criterion, i.e., that signal 21 is above threshold value 23, is maintained continuously for at least time $t_{robust}$, the decision is not made until instant 25 that the criterion has finally been fulfilled. At this instant 25 the second stage of the airbag is then fired, if the additional criterion (not shown), which is treated according to the criterion shown, is also fulfilled by this time. Until time $t_{delaymax}$ it may be possible to fire the second stage in this manner. If curve 21 were not above threshold value 23 for time $t_{robust}$ until after time $t_{delaymax}$, then the second stage is not fired until residual firing time $t_{delay\ disposal}$ (see FIG. 8, instant 32).

Figure 6:
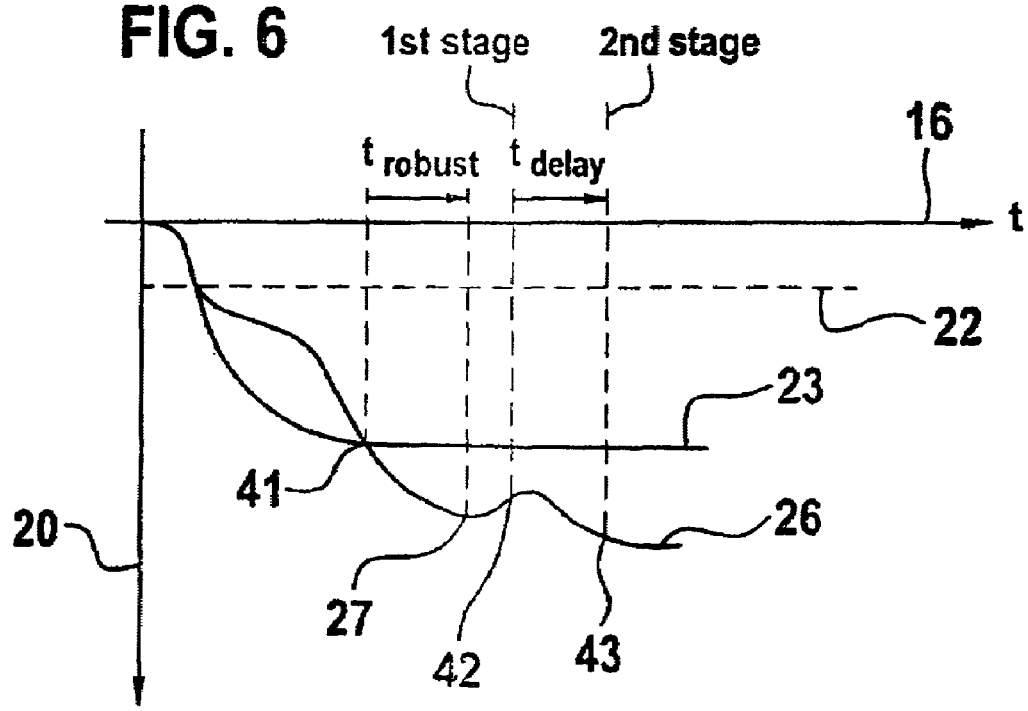
FIG. 6 shows a third velocity-time diagram of the X integrator profile.

FIG. 6 shows a third velocity-time diagram. Abscissa, ordinate as well as threshold value 22 and threshold value 23 are as in FIG. 5. Here the case is depicted that a criterion for the second stage is fulfilled before the first stage has been fired. Consequently the second stage is then fired after minimum time $t_{delay}$. The condition is that the additional criterion is also present correspondingly early. Criterion 26 exceeds threshold value 23 at instant 41. The threshold value is above this threshold value 23 for time $t_{robust}$. At instant 27, after time $t_{robust}$ has passed, it is then recognized and stored by processor 5 that the criterion has been fulfilled. This is set as a trigger flag in memory 6. The first stage of the airbag is now fired at instant 42. At instant 43 time $t_{delay}$, the minimum time after which the second stage may be fired, has passed, and the second stage is now also fired.

Figure 7:
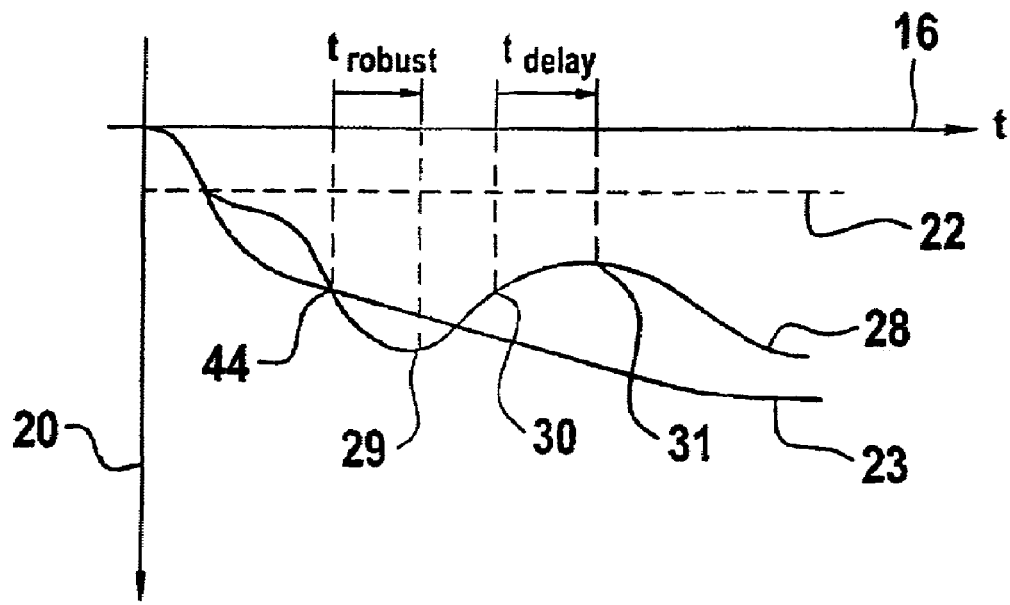
FIG. 7 shows a fourth velocity-time diagram of the X integrator profile.

FIG. 7 shows a fourth velocity-time diagram. Abscissa and ordinate as well as threshold value 22 and threshold value 23 are as before. A criterion 28 now describes the measured signal. At instant 44 measurement signal 28 exceeds threshold value 23 for the first time. At instant 29 time $t_{robust}$ has passed, so that it is then recognized that the criterion has been fulfilled. At instant 30 the first stage is fired, and after time $t_{delay}$ at instant 31 the second stage is fired. And this occurs even though curve 28 is now below threshold value 23. The condition is that the additional criterion is fulfilled by instant 31.

Figure 8:
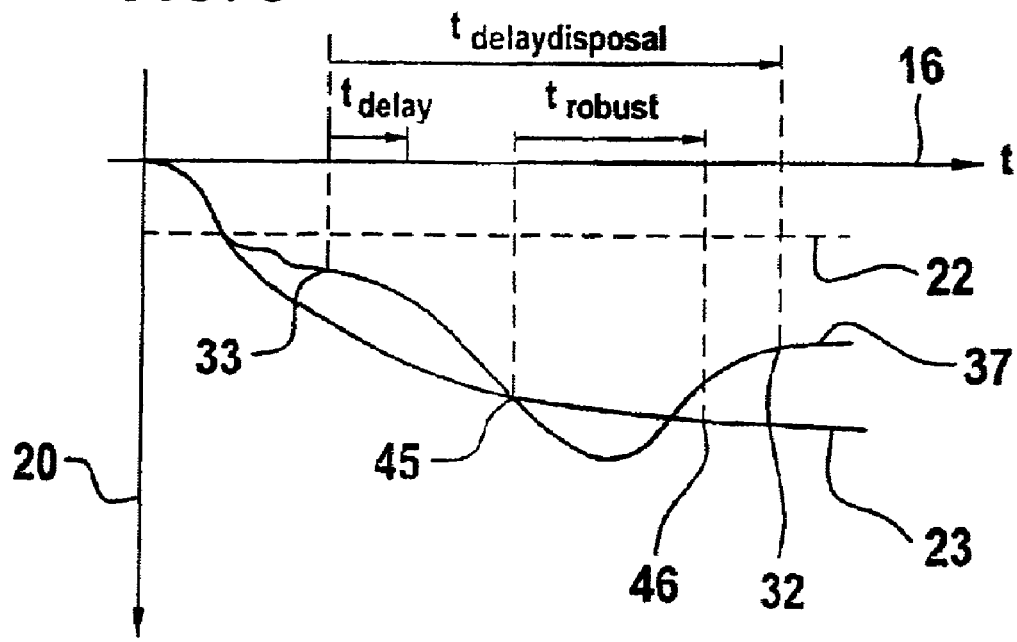
FIG. 8 shows a fifth velocity-time diagram of the X integrator profile.

FIG. 8 shows a fifth velocity-time diagram, in which ordinate and abscissa, threshold value 22 and threshold value 23 are again used as before. Curve 37 describes the criterion. At instant 33 the first stage of the airbag is fired. Starting at instant 33 it is waited for time $t_{delay}$ to pass; during this time no firing of the second stage is allowed. At instant 45 measurement signal 37 exceeds threshold value 23. Starting at instant 45 time $t_{robust}$ begins, during which measurement signal 37 however drops below threshold value 23 again, so that when time $t_{robust}$ has passed, at instant 46, it is determined that the criterion was not fulfilled. It is therefore required now to wait for residual firing time $t_{delay}$ disposal to pass, i.e., until instant 32, to fire the second stage. Residual firing time $t_{delay}$ disposal is the latest time at which the second stage is fired. This is independent of whether or not the additional criterion is fulfilled. Since depicted criterion 37 is not fulfilled, the second stage is always triggered at instant 32.

Figure 9:
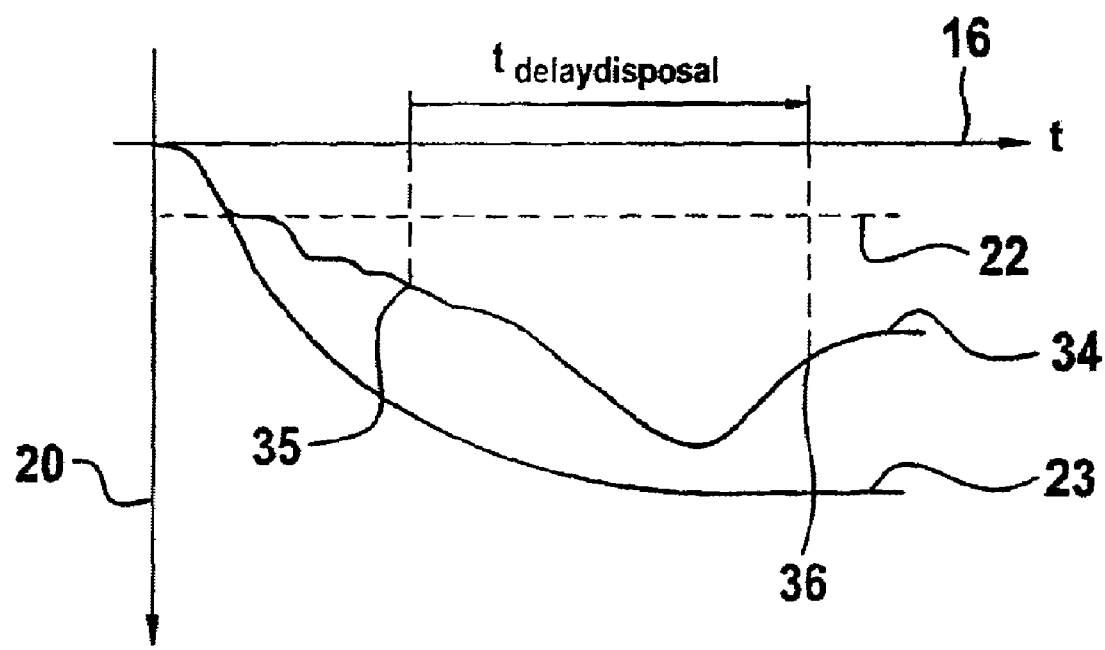
FIG. 9 shows a sixth velocity-time diagram of the X integrator profile.

FIG. 9 shows a sixth velocity-speed diagram, in which abscissa and ordinate, threshold value 22 and threshold value 23 are again the same as before. Curve 34 describes one criterion. At instant 35 the first stage is fired. But since curve 34 now does not exceed threshold value 23 at any time, the second stage is not fired until instant 36 after the maximum delay time, residual firing time $t_{delay\ disposal}$, has passed. This is independent of whether or not the additional criterion is fulfilled. Since depicted criterion 34 is not fulfilled, the second stage is always triggered at instant 36.

Two criteria may be always used in triggering the second airbag stage. These criteria are calculated separately from the basic algorithm. The basic algorithm is used only to trigger the first airbag stage. With medium and minor crash severity, the decision to trigger the second airbag stage depends on two criteria. More may also be possible. The criteria may be selected and combined freely from a pool of criteria. A possibility for the criteria is the X integrator of the acceleration signal. However, other parameters may also be used here. These include the Y integrator, a combination of the X and Y integrators, or a double integral of the Y integrator. At the same time, the first criterion, which is used for the basic triggering algorithm to trigger the restraint arrangement, may also be the X integrator. It may be possible that the integration may only be considered in a window, or that it may be taken only from the absolute value of the velocity signal, or that it is used by the pure velocity signal, i.e., in the conventional manner. This may also apply if the sensors are mounted for example at an angle to the direction of travel. At high crash severity, i.e., when the first airbag stage is triggered within the crash severity time $T_{fast}$, the second airbag stage is triggered after $T_{dfast}$, irrespective of whether the criteria for the second stage are already fulfilled.

What is claimed is:

1. A method of triggering at least one airbag in a vehicle in at least two stages, comprising:

detecting an acceleration of the vehicle using at least one acceleration sensor of an airbag controller located centrally in the vehicle;

deriving at least two criteria from the at least one acceleration sensor, wherein the at least two criteria are selected depending on a type of vehicle; and triggering a second stage of the at least one airbag as a function of relationship between the at least two criteria;

wherein the second stage is triggered if each of the at least two criteria exceeds pre-defined threshold values within respective pre-defined times, and wherein the second stage is fired after a residual firing time if at least one of the at least two criteria does not reach the respective threshold value in the respective pre-defined time.

2. The method according to claim 1, further comprising: selecting the at least two criteria from the following parameters:

an acceleration in a direction of travel, an aggregate acceleration in the direction of travel, an integrated absolute value of the acceleration in the direction of travel, an integrated acceleration in the direction of travel in a pre-defined time window, an acceleration transverse to the direction of travel, an aggregate acceleration transverse to the direction of travel, a sum of the integrated acceleration in and transverse to the direction of travel, a double integrated acceleration transverse to the direction of travel, and an acceleration determined at an angle to the direction of travel.

3. The method according to claim 1, further comprising:

pre-defining a minimum delay time for the firing of the second stage.

4. The method according to claim 1, further comprising:

using respective time-dependent characteristic curves to determine the pre-defined threshold values.

5. The method according to claim 1, further comprising:

recognizing that the respective threshold value has been exceeded by the respective criterion if the respective criterion is above the respective threshold value for a pre-defined decision time.

6. The method according to claim 3, wherein the second stage is fired after the minimum delay time if the first stage is triggered within a pre-defined accident severity time.

7. The method according to claim 4, further comprising:

modifying the characteristic curves depending on whether a seat belt is being used.

* * * * *